United States Patent
Kim et al.

(10) Patent No.: US 8,503,522 B2
(45) Date of Patent: Aug. 6, 2013

(54) VIDEO ENCODING/DECODING APPARATUS AND ADAPTIVE OVERLAPPED BLOCK MOTION COMPENSATION METHOD AND APPARATUS EMPLOYING ADAPTIVE WEIGHTS THEREFOR

(75) Inventors: Hayoon Kim, Seongnam-si (KR); Yonggoo Kim, Seoul (KR); Yoonsik Choe, Goyang-si (KR); Yungho Choi, Anyang-si (KR)

(73) Assignee: SK Telecom Co., Ltd., Seoul (KR)

( * ) Notice: Subject to any disclaimer, the term of this patent is extended or adjusted under 35 U.S.C. 154(b) by 294 days.

(21) Appl. No.: 13/125,254

(22) PCT Filed: Oct. 14, 2009

(86) PCT No.: PCT/KR2009/005905
§ 371 (c)(1),
(2), (4) Date: Apr. 20, 2011

(87) PCT Pub. No.: WO2010/117117
PCT Pub. Date: Oct. 14, 2010

(65) Prior Publication Data
US 2011/0200098 A1    Aug. 18, 2011

(30) Foreign Application Priority Data
Oct. 21, 2008 (KR) .......... 10-2008-0103082

(51) Int. Cl.
*H04N 11/02* (2006.01)
(52) U.S. Cl.
USPC ............ 375/240.02; 375/240.12; 375/240.16
(58) Field of Classification Search
USPC ....................... 375/240.01–240.29
See application file for complete search history.

(56) References Cited

U.S. PATENT DOCUMENTS

| | | | |
|---|---|---|---|
| 5,410,350 A * | 4/1995 | Kato et al. ................. | 348/400.1 |
| 5,764,805 A | 6/1998 | Martucci | |
| 7,983,493 B2 * | 7/2011 | Zhang .......................... | 382/232 |
| 2004/0091051 A1 | 5/2004 | Youn | |
| 2005/0078755 A1 | 4/2005 | Woods | |
| 2007/0009044 A1 * | 1/2007 | Tourapis et al. ......... | 375/240.25 |

OTHER PUBLICATIONS

International Search Report mailed Jun. 1, 2010 for PCT/KR2009/005905.

* cited by examiner

*Primary Examiner* — David Czekaj
*Assistant Examiner* — Leron Beck
(74) *Attorney, Agent, or Firm* — Lowe Hauptman Ham & Berner, LLP

(57) ABSTRACT

The present disclosure provides an adaptive overlapped block motion compensation apparatus employing adaptive weights including: an $R_{BMC}(x,y)$ calculator for calculating residual signal $R_{BMC}(x,y)$ in block motion estimation; a $D_N(x,y)$ calculator for calculating differential pixel value $D_N(x,y)$ between a motion compensated block generated by a motion vector of an adjacent block and a currently motion compensated block; a unit for updating and setting additional information for performing an adaptive overlapped block motion compensation based on $R_{BMC}(x,y)$ and $D_N(x,y)$; and an adaptive overlapped block motion compensation operating on respective pixels in certain pixel units based on the additional information, progressing to subsequent pixels if an absolute value of $R_{BMC}(x,y)$ is not greater than the additional information, and if the absolute value of $R_{BMC}(x,y)$ is greater than the additional information, calculating an $R_{OBMC}(x,y)$ with an $H_N(x,y)$ selectively signed so that an absolute value of $R_{OBMC}(x,y)$ is smaller than the absolute value of $R_{BMC}(x,y)$.

20 Claims, 8 Drawing Sheets

|   |   |   |   |   |   |   |   |
|---|---|---|---|---|---|---|---|
| 4 | 5 | 5 | 5 | 5 | 5 | 5 | 4 |
| 5 | 5 | 5 | 5 | 5 | 5 | 5 | 5 |
| 5 | 5 | 6 | 6 | 6 | 6 | 5 | 5 |
| 5 | 5 | 6 | 6 | 6 | 6 | 5 | 5 |
| 5 | 5 | 6 | 6 | 6 | 6 | 5 | 5 |
| 5 | 5 | 6 | 6 | 6 | 6 | 5 | 5 |
| 5 | 5 | 5 | 5 | 5 | 5 | 5 | 5 |
| 4 | 5 | 5 | 5 | 5 | 5 | 5 | 4 |

(a) $H_C(x,y)$

|   |   |   |   |   |   |   |   |
|---|---|---|---|---|---|---|---|
| 2 | 2 | 2 | 2 | 2 | 2 | 2 | 2 |
| 1 | 1 | 2 | 2 | 2 | 2 | 1 | 1 |
| 1 | 1 | 1 | 1 | 1 | 1 | 1 | 1 |
| 1 | 1 | 1 | 1 | 1 | 1 | 1 | 1 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

(b) $H_T(x,y)$

|   |   |   |   |   |   |   |   |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 1 | 1 | 1 | 1 | 1 | 1 | 1 | 1 |
| 1 | 1 | 1 | 1 | 1 | 1 | 1 | 1 |
| 1 | 1 | 2 | 2 | 2 | 2 | 1 | 1 |
| 2 | 2 | 2 | 2 | 2 | 2 | 2 | 2 |

(c) $H_B(x,y)$

|   |   |   |   |   |   |   |   |
|---|---|---|---|---|---|---|---|
| 2 | 1 | 1 | 1 | 0 | 0 | 0 | 0 |
| 2 | 2 | 1 | 1 | 0 | 0 | 0 | 0 |
| 2 | 2 | 1 | 1 | 0 | 0 | 0 | 0 |
| 2 | 2 | 1 | 1 | 0 | 0 | 0 | 0 |
| 2 | 2 | 1 | 1 | 0 | 0 | 0 | 0 |
| 2 | 2 | 1 | 1 | 0 | 0 | 0 | 0 |
| 2 | 2 | 1 | 1 | 0 | 0 | 0 | 0 |
| 2 | 1 | 1 | 1 | 0 | 0 | 0 | 0 |

(d) $H_L(x,y)$

|   |   |   |   |   |   |   |   |
|---|---|---|---|---|---|---|---|
| 0 | 0 | 0 | 0 | 1 | 1 | 1 | 2 |
| 0 | 0 | 0 | 0 | 1 | 1 | 2 | 2 |
| 0 | 0 | 0 | 0 | 1 | 1 | 2 | 2 |
| 0 | 0 | 0 | 0 | 1 | 1 | 2 | 2 |
| 0 | 0 | 0 | 0 | 1 | 1 | 2 | 2 |
| 0 | 0 | 0 | 0 | 1 | 1 | 2 | 2 |
| 0 | 0 | 0 | 0 | 1 | 1 | 2 | 2 |
| 0 | 0 | 0 | 0 | 1 | 1 | 1 | 2 |

VIDEO ENCODING/DECODING APPARATUS AND ADAPTIVE OVERLAPPED BLOCK MOTION COMPENSATION METHOD AND APPARATUS EMPLOYING ADAPTIVE WEIGHTS THEREFOR

CROSS REFERENCE TO RELATED APPLICATION

This application claims the priority of Korean Patent Application No. 10-2008-0103082, filed on Oct. 21, 2008, in the KIPO (Korean Intellectual Property Office), the disclosure of which is incorporated herein in their entirety by reference. Further, this application is the National Phase application of International Application No. PCT/KR2009/005905, filed Oct. 14, 2009, which designates the United States and was published in Korean. Each of these applications is hereby incorporated by reference in their entirety into the present application.

TECHNICAL FIELD

The present disclosure relates to a video data compression/reconstruction technique. More particularly, the present disclosure relates to a video encoding/decoding apparatus and an adaptive overlapped block motion compensation method and an apparatus employing adaptive weights thereof wherein the weights used by the overlapped block motion compensation by pixel unit are adaptively varied so that the result of the overlapped block motion compensation is always superior over a block motion compensation to be closer to the pixel values of the original image.

BACKGROUND ART

The statements in this section merely provide background information related to the present disclosure and may not constitute prior art.

Video compression coding process using motion compensation is based on the assumption of 'temporal similarity' meaning the pixel values belonging to an image in a video sequence are very similar to the pixel values of the previous image. However, because the total transmission/recording of such correspondences of the respective pixels to the positions of the previous image pixels involves too much amount of information to transmit/record to negate taking the full advantage by the temporal similarity, the most currently existing video compression methods are merely providing information on limitedly selected temporal similarity. A representative example is the block based motion compensation method wherein the image to be encoded is divided into nonoverlapping blocks in certain block units and a single motion per block is transmitted to apply a same positional correspondence to all of the pixels in the respective blocks in a decoding stage. Although such block based motion compensation method significantly contributes to compressive encoding by taking advantage of the natural image characterized that the general positional correspondences (motion vector) by the unit of pixel are very smooth, distortions occur in blocks with changes of motions existing in the pixels at the positional correspondences by specific pixels causing the blocking artifact to generate unnaturally distorted reconstruction of pixel values at boundaries of adjacent blocks.

In order to resolve such blocking artifacts and perform an effective compression coding that can insure a higher video quality, various techniques have been developed including a loop-filter method, an overlapped block motion compensation, a variable-size block motion compensation, and others. This overlapped block motion compensation is an effective technique used in performing the motion reconstruction on the respective blocks to substantially reduce the motion reconstruction errors at block boundaries by performing the motion reconstruction through a weighted sum of reconstructed pixels at the present location by using the motions of neighboring blocks and reconstructed pixels of the current block. In such overlapped block motion compensation, determining what weights to use in the weighted sum of the respective reconstructed pixels is the most decisive factor that gives the direct affects on the performance of the motion reconstruction because the very determination of depth of reflecting the motions of neighboring blocks on the motion reconstruction of the current block has the most intimate control over nonsimilarity at the boundaries between the neighboring blocks and the current block.

One of conventional techniques to optimize the weight to the overlapped block motion reconstruction, Michael T. Orchard and Gary J. Sullivan ("Overlapped block motion compensation: an estimation-theoretic approach", IEEE Trans. on Image Processing, vol. 3, no. 5, pp. 693-699, Wept. 1994) assumes that a pixel value of a current frame equals to an arbitrary pixel value of the prior frame and interprets the pixel value in the current frame as a mean of the conditional probability of the pixel value at the arbitrary position of the prior frame and its positional transition. Through such interpretation, a statistical solution was presented toward the weight value and overlapped block motion estimation method to minimize the energy of the mean-squared error of the overlapped block motion estimation. In addition, Jiro Katto and Mutsumi Ohta("An analytical framework for overlapped block motion compensation" in Proc. ICASSP'95, 9-12 May, 1995, vol. 4, pp. 2189-2192) and Jiro Katto("Overlapped motion compensation using a window function which varies in response to an input picture", U.S. Pat. No. 5,602,593, Feb. 11, 1997), under the assumption that a pixel value in an image has been moved from a particular position in the prior image and that the spatial correlation of pixel values is attenuated exponentially depending on the distance between the pixels, prepared an analytical foundation for the overlapped block motion reconstruction, and thereby dealt with the weight optimization problem of the overlapped block motion reconstruction and suggested the analytical solution thereof. Though such prior arts have their respective theoretical frames in which optimal overlapped block motion weight value have been provided achieving great performance improvements, they entail drawbacks of the inability to directly measure necessary parameters for calculating the weight value or the necessity of large data for the statistical estimations and a high computation complexity resulting in a possible limitation of its real time application.

To solve this problem, Wentao Zheng, Yoshiaki Shishikui, Masahide Naemura, Yasuaki Kanatsugu and Susumu Itoh ("Analysis of overlapped block motion compensation based on a statistical motion distribution model", in Proc. ICIP'01, 7-10 October 2001, vol. 3, pp. 522-525) and Wentao Zheng, Yoshiaki Shishikui, Masahide Naemura, Yasuaki Kanatsugu and Susumu Itoh("Analysis of space-dependent characteristics of motion-compensated frame differences based on a statistical motion distribution model", IEEE Trans. on Image Processing, vol. 11, no. 4, April 2002) assumes the respective pixel motions in a video signal to be statistical models and interprets the characteristics of error residual signal by the pixels locations in the block motion reconstruction and the overlapped block motion reconstruction. In addition, Bo Tao and Michael T. Orchard("Window design for overlapped block motion compensation through statistical motion modeling" in Proc. Asilomar Conference on Signal, Systems & Computers, 2-5 November 1998, vol. 1, pp. 372-376) and Bo Tao and Michael T. Orchard("A parametric solution for optimal overlapped block motion compensation", IEEE Trans. on Image Processing, vol. 10, no. 3, pp. 341-350, March 2001) regarded the uncertainty of an estimated motion vector of a pixel to be the quantization error on the basis of the autocorrelation of pixel brightness values and the statistical model of the motion field and thereby suggested a parameter-based optimal overlapped block motion compensation weight solution. Since these techniques are devised to calculate the optimal overlapped block motion compensation weight based on the estimation of a small number of parameters for expressing the assumed model so as not to require a large amount of image data for the estimation, they may provide the optimal weight matrix while intelligently adapting to changes in probabilistic characteristics of the video sequence. However, they still have unavoidable shortcomings of the over-smoothing problems at the edge regions due to inappropriateness of the models, a performance deterioration problem depending on the measures used in parameter estimation and the estimation accuracy, and other similar problems.

DISCLOSURE

Technical Problem

Therefore, the present disclosure has been made for providing a video encoding/decoding apparatus and an adaptive overlapped block motion compensation method and an apparatus employing adaptive weights thereof wherein the weights used by the overlapped block motion compensation in pixel unit are adaptively varied so that the result of the overlapped block motion compensation is always superior over a block motion compensation to be closer to the pixel values of the original image and thereby improving the performance of the overlapped block motion compensation across a wider region of image without the performance of overlapped block motion compensation being influenced by limitations of the model, or the estimation accuracy of model parameter.

Technical Solution

One aspect of the present disclosure provides an adaptive overlapped block motion compensation apparatus employing adaptive weights including: an $R_{BMC}(x,y)$ calculator for performing a calculation of a residual signal $R_{BMC}(x,y)$ in a block motion estimation; a $D_N(x,y)$ calculator for performing a calculation of a differential pixel value $D_N(x,y)$ between a motion compensated block generated by a motion vector of an adjacent block and a currently motion compensated block; an additional information updating/setting unit for updating and setting additional information for performing an adaptive overlapped block motion compensation based on the $R_{BMC}(x,y)$ and the $D_N(x,y)$; and an adaptive overlapped block motion compensator for performing the adaptive overlapped block motion compensation for respective pixels in certain pixel units based on the additional information, progressing the adaptive overlapped block motion compensation over to subsequent pixels as long as an absolute value of the $R_{BMC}(x,y)$ is smaller than or equal to the additional information, and if the absolute value of the $R_{BMC}(x,y)$ is greater than the additional information, calculating an $R_{OBMC}(x,y)$ with an $H_N(x,y)$ selectively signed so that an absolute value of the $R_{OBMC}(x,y)$ is smaller than the absolute value of the $R_{BMC}(x,y)$.

Another aspect of the present disclosure provides an adaptive overlapped block motion compensation method employing adaptive weights including: performing a calculation of a residual signal $R_{BMC}(x,y)$ in a block motion estimation; performing a calculation of a differential pixel value $D_N(x,y)$ between a motion compensated block generated by a motion vector of an adjacent block and a currently motion compensated block; updating and setting additional information for performing an adaptive overlapped block motion compensation based on the $R_{BMC}(x,y)$ and the $D_N(x,y)$; and performing the adaptive overlapped block motion compensation for respective pixels in certain pixel units based on the additional information, progressing the adaptive overlapped block motion compensation over to subsequent pixels as long as an absolute value of the $R_{BMC}(x,y)$ is smaller than or equal to the additional information, and if the absolute value of the $R_{BMC}(x,y)$ is greater than the additional information, calculating an $R_{OBMC}(x,y)$ with an $H_N(x,y)$ selectively signed so that an absolute value of the $R_{OBMC}(x,y)$ is smaller than the absolute value of the $R_{BMC}(x,y)$.

The additional information updating/setting unit (or the step of updating/setting additional information) includes: an $H_N(x,y)$ sign determiner for making a determination on a sign of the $H_N(x,y)$ (or the step of performing a determination on a sign of the $H_N(x,y)$) that is a weight based on a sign of the $R_{BMC}(x,y)$ after the calculation and a sign of the $D_N(x,y)$ after the calculation; an $R_{OBMC}(x,y)$ calculator for performing a calculation of the residual signal $R_{OBMC}(x,y)$ (or the step of performing a calculation of the residual signal $R_{OBMC}(x,y)$) in an overlapped block motion reconstruction based on the sign of the $H_N(x,y)$ upon the determination; a reference pixel updater (or the step of updating a reference pixel) for updating a first reference pixel or a second reference pixel on the basis of the sign of the $R_{BMC}(x,y)$ after the calculation and a sign of the $R_{OBMC}(x,y)$ after the calculation so that the first reference pixel is updated to be smaller one of an absolute value of the first reference pixel preceding the $R_{OBMC}(x,y)$ and an absolute value of the $R_{OBMC}(x,y)$ if the sign of the $R_{BMC}(x,y)$ and the sign of the $R_{OBMC}(x,y)$ are same, and the second reference pixel is updated to be larger one of an absolute value of the second reference pixel preceding the $R_{BMC}(x,y)$ and the absolute value of the $R_{BMC}(x,y)$ if the sign of the $R_{BMC}(x,y)$ and the sign of the $R_{OBMC}(x,y)$ are not same; and an additional information setter (or the step of setting the additional information) for setting larger one of the first reference pixel and the second reference pixel as the additional information.

The $H_N(x,y)$ sign determiner (or the step of performing a determination on a sign of the $H_N(x,y)$) may determine the sign of the $H_N(x,y)$ so that the $R_{BMC}(x,y)$ valued positive causes $H_N(x,y) \times D_N(x,y)$ to be signed negative and determine the sign of the $H_N(x,y)$ so that the $R_{BMC}(x,y)$ valued negative causes $H_N(x,y) \times D_N(x,y)$ to be signed positive. The $R_{OBMC}(x,y)$ calculator (or the step of performing a calculation of the residual signal $R_{OBMC}(x,y)$) and the adaptive overlapped block motion compensator (or the step of performing the adaptive overlapped block motion compensation) may calculate the $R_{OBMC}(x,y)$ based on a formula of $R_{OBMC}(x,y)=R_{BMC}(x,y)+H_N(x,y) \times D_N(x,y)$. The reference pixel updater (or the step of updating a reference pixel) may perform the updating of the first reference pixel and the second reference pixel sequentially with respect to all pixels in the certain pixel units, and then the additional information setter (or the step of setting the additional information) may set the additional information. The adaptive overlapped block motion compensator (or the step of performing the adaptive overlapped block motion compensation) may determine a sign of the $H_N(x,y)$ so that the $R_{BMC}(x,y)$ and $H_N(x,y) \times D_N(x,y)$ are signed opposite to each other.

Yet another aspect of the present disclosure provides a video encoding apparatus including: a motion estimator/compensator for performing an adaptive overlapped block motion compensation for respective pixels in certain pixel units based on additional information having been set, progressing the adaptive overlapped block motion compensation over to subsequent pixels as long as an absolute value of a residual signal $R_{BMC}(x,y)$ in a block motion reconstruction is smaller than or equal to the set additional information, and if the absolute value of the $R_{BMC}(x,y)$ is greater than the additional information, calculating an $R_{OBMC}(x,y)$ with an $H_N(x,y)$ selectively signed so that an absolute value of the $R_{OBMC}(x,y)$ is smaller than the absolute value of the $R_{BMC}(x,y)$ to predict predicted pixel values of respective pixels in an image; a subtractor for calculating a difference between an original pixel value of each pixel of a current block and a predicted pixel value of each pixel of the current block to generate a residual signal; a transformer for performing a transform of the residual signal into frequency coefficients; a quantizer for performing a quantization of the frequency coefficients after the transform; and an encoder for encoding the frequency coefficients after the quantization into a bitstream.

The motion estimator/compensator calculates the $R_{OBMC}(x,y)$ based on a formula of $R_{OBMC}(x,y)=R_{BMC}(x,y)+H_N(x,y) \times D_N(x,y)$; determines a sign of the $H_N(x,y)$ so that the $R_{BMC}(x,y)$ and $H_N(x,y) \times D_N(x,y)$ are signed opposite to each other; makes a determination on a sign of the $H_N(x,y)$ based on a sign of the $R_{BMC}(x,y)$ and a differential pixel value $D_N(x,y)$ between a motion compensated block generated by a motion vector of an adjacent block and a currently motion compensated block; performs a calculation of a residual signal $R_{OBMC}(x,y)$ in an overlapped block motion reconstruction based on the sign of the $H_N(x,y)$ upon the determination; updates a first reference pixel or a second reference pixel based on a sign of the $R_{OBMC}(x,y)$ after the calculation and the sign of the $R_{BMC}(x,y)$ so that the first reference pixel is updated to be smaller one of an absolute value of the first reference pixel preceding the $R_{OBMC}(x,y)$ and an absolute value of the $R_{OBMC}(x,y)$ if the sign of the $R_{BMC}(x,y)$ and the sign of the $R_{OBMC}(x,y)$ are same, and the second reference pixel is updated to be larger one of an absolute value of the second reference pixel preceding the $R_{BMC}(x,y)$ and the absolute value of the $R_{BMC}(x,y)$ if the sign of the $R_{BMC}(x,y)$ and the sign of the $R_{OBMC}(x,y)$ are not same; and sets larger one of the first reference pixel and the second reference pixel as the additional information.

Yet another aspect of the present disclosure provides a video decoding apparatus including: a comparator for comparing an absolute value of a residual signal $R_{BMCT}(x,y)$ in a block motion reconstruction to additional information having been set; and an adaptive overlapped block motion compensator for performing an adaptive overlapped block motion compensation on each of successive pixels as long as the absolute value of the $R_{BMCT}(x,y)$ is smaller than or equal to the additional information, and if the absolute value of the $R_{BMCT}(x,y)$ is greater than the additional information, calculating an $R_{OBMC}(x,y)$ with an $H_N(x,y)$ selectively signed so that an absolute value of the $R_{OBMC}(x,y)$ is greater than the absolute value of the $R_{BMCT}(x,y)$.

The adaptive overlapped block motion compensator may calculate the $R_{OBMC}(x,y)$ based on a formula of $R_{OBMC}(x,y)=R_{BMC}(x,y)+H_N(x,y) \times D_N(x,y)$, and determine a sign of the $H_N(x,y)$ so that the $R_{BMC}(x,y)$ and $H_N(x,y) \times D_N(x,y)$ are signed identical to each other. The additional information may be generated and provided by the video encoding apparatus.

Advantageous Effects

The disclosure uses negative, 0 and positive weights adaptively for an overlapped block motion estimation/compensation by pixel unit, whereby significantly reducing the calculation volume and the residual signal energy at block boundaries to be encoded by using just insignificant additional information to greatly improve the performance of a video compression apparatus and eventually obtain an enhanced video quality for the same bits or amount of information.

DESCRIPTION OF DRAWINGS

FIG. 9 is an illustration of a weight matrix of H.263 overlapped block motion reconstruction according to an aspect.

MODE FOR INVENTION

Figure 1:
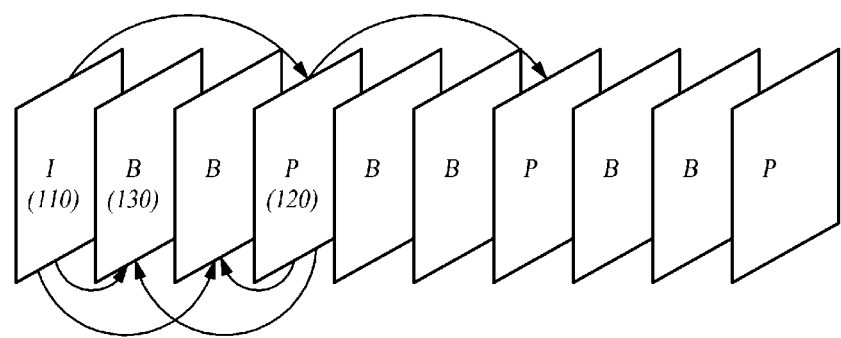
FIG. 1 is a diagram showing video frames comprising a video and being used for an inter prediction between different frames.

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear. Also, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

Since a video on a screen is composed of as much as thirty frames per second causing a short inter-frame interval, human eyes cannot distinguish between the frames. For this reason, casting the thirty frames within a second will make the observing eyes believe the frames are a continuous movement.

If there is such a similarity between a previous frame and a current frame, it is possible to make a prediction of a pixel value of one frame from a known value of a pixel constituting a preceding frame (This kind of prediction is called an inter prediction carried out between frames).

Such video data encoding and decoding are performed based on the technology of motion prediction. Motion prediction is carried out in a way of referencing to a past frame on a temporal axis or to both of the past frame and a future frame. The reference frame is a frame that is used as a reference for encoding or decoding a current frame. Additionally, in the block-based video coding, a still image (frame) forming the video is divided by macroblocks and subblocks which constitute the macroblock so that the image is motion-predicted and encoded in units of a block.

Prediction of a next pixel is also possible within a same frame by taking advantage of the correlations among pixel signals (This kind of prediction is called an intra prediction carried out inside a frame).

FIG. 1 is a diagram showing video frames comprising a video and being used for an inter prediction between different frames.

Referring to FIG. 1, video data is consisted of a series of still images. These still images are classified by a group of pictures (GOP). One GOP has an I frame 110, P frames 120, and B frames 130. I frame 110 is adapted to be encoded by itself without using a reference frame, and P frames 120 and B frames 130 are encoded through performing a motion estimation and a compensation using a reference frame. Especially, B frames 130 are encoded by forwardly and backwardly (bidirectional) predicting a past frame and a future frame, respectively.

Figure 2:
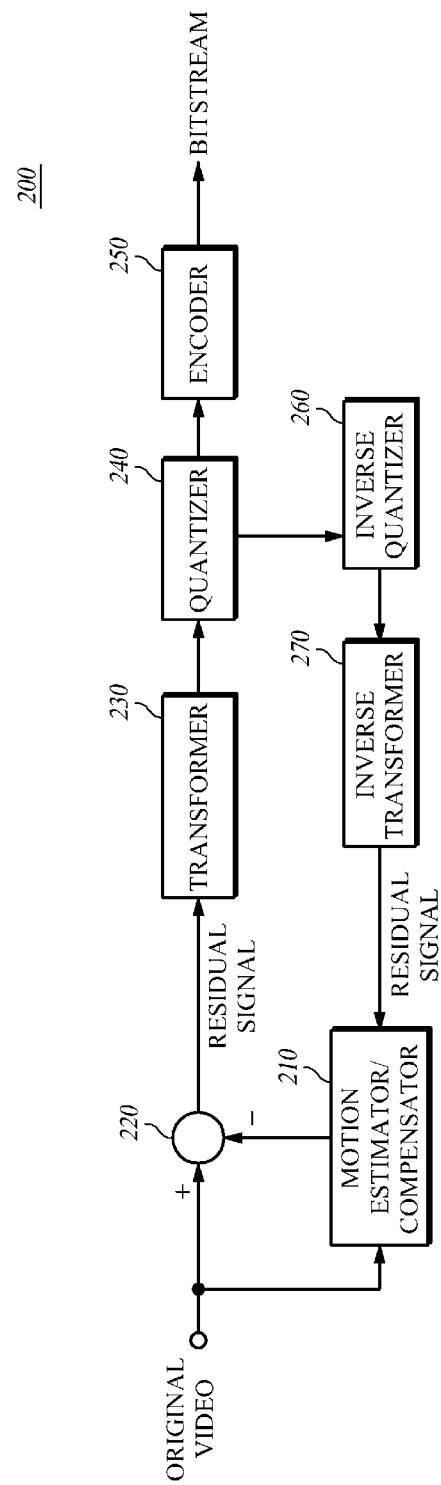
FIG. 2 is a block diagram of a video encoding apparatus according to an aspect.

FIG. 2 is a block diagram for showing a video encoding apparatus 200 according to an aspect.

Referring to FIG. 2, video encoding apparatus 200 includes a motion estimator/compensator 210, a subtractor 220, a transformer 230, a quantizer 240, and an encoder 250.

Video encoding apparatus 200 may be a personal computer or PC, notebook or laptop computer, personal digital assistant or PDA, portable multimedia player or PMP, PlayStation Portable or PSP, or mobile communication terminal, smart phone or such devices, and represents a variety of apparatuses equipped with, for example, a communication device such as a modem for carrying out communications between various devices or wired/wireless communication networks, a memory for storing various programs for encoding videos and related data, and a microprocessor for executing the programs to effect operations and controls.

As described above, motion estimator/compensator 210 may predict the current block (or macroblock) by using either one or combined both of the motion prediction-based inter prediction and intra prediction for predicting a latter pixel by taking advantage of the correlations among the pixel signals within a single frame.

For example, motion estimator/compensator 210 may be formed by two divided sections of a motion estimator (not shown) and a motion compensator (not shown). The motion estimator searches the predicted value of a motion of the current frame macroblock from the reference frame and outputs their motion difference as a motion vector. In other words, the desired macroblock to find is searched for within a predetermined search area of the reference frame to identify the closest macroblock and its degree of motion is outputted as the motion vector. From the reference frame, the motion compensator gets a predicted macroblock corresponding to the obtained motion vector.

Alternatively, motion estimator/compensator 210 may be an intra predictor which predicts the current macroblock of the current frame by using macroblocks neighboring the current block, and it predicts the predicted macroblock by calculating predicted pixel values of the respective pixels in the current block using one or more pixel values of one or more adjacent macroblocks. Here, the adjacent macroblocks may be one or more macroblocks which were compressed previously of the current macroblock and are neighboring the current macroblock.

The detailed features of motion estimator/compensator 210 according to an aspect will be described with reference to FIG. 3.

Subtractor 220 subtracts the predicted macroblock from the macroblock of the original video to calculate their difference for generating residual signals.

Transformer 230 transforms the residual signals generated by subtractor 220 into a frequency domain to obtain frequency coefficients. Here, transformer 230 performs the transform into frequency domain by using various techniques including discrete cosine transform (DCT) or wavelet transform that transforms video signals on the time axis to those of the frequency axis. In the case of I frame described with reference to FIG. 1, transformer 230 transforms the macroblocks of the original video into the frequency domain.

Quantizer 240 performs quantization on the frequency coefficients that went through transformation by transformer 230.

A residual signal refers to the macroblock of the original video subtracted by the predicted macroblock, and in order to reduce the data quantity in the encoding operation, the value of the residual block is encoded. Because errors are generated during the quantization, the bitstream of video data carries errors occurred through the transform and quantization.

Video encoding apparatus 200 may also incorporate an inverse quantizer 260 and an inverse transformer 270 to obtain the reference frame.

To obtain the reference frame, the quantized residual signal is added to the predicted video from motion estimator/compensator 210 after going through inverse quantizer 260 and inverse transformer 270 and the sum is stored in a reference frame storage unit (not shown). In the case of the I frame, it proceeds through inverse quantizer 260 and inverse transformer 270 and is stored in the reference frame storage unit. In other words, assuming the original video is A and the predicted video is B, transformer 230 receives an input of the difference A-B between the original video and predicted video to perform the transform.

Encoder 250 encodes the quantized frequency coefficients from quantizer 240 into a bitstream. For the encoding, an entropy method may be used although various other unlimited coding techniques are available for use.

Figure 3:
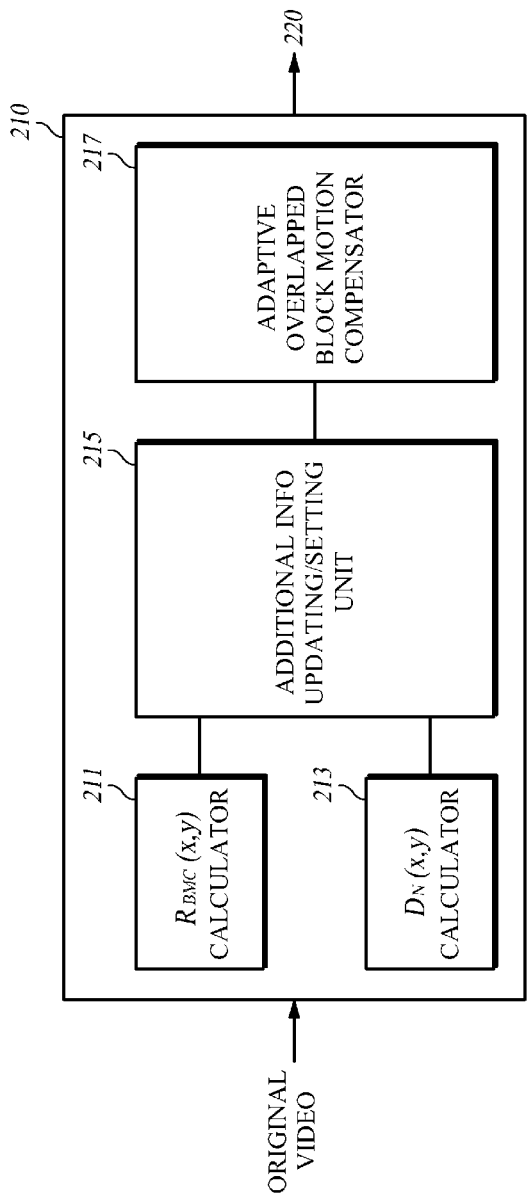
FIG. 3 is a block diagram of an adaptive overlapped block motion compensation apparatus employing adaptive weights according to an aspect.

FIG. 3 is a block diagram of an adaptive overlapped block motion compensation apparatus employing adaptive weights according to an aspect which corresponds to motion estimator/compensator 210 in FIG. 2 and is referenced by the same number 210.

As illustrated, this aspect of adaptive overlapped block motion compensation apparatus 210 employing adaptive weights includes an $R_{BMC}(x,y)$ calculator 211, a $D_N(x,y)$ calculator 213, an additional information updating/setting unit 215, and an adaptive overlapped block motion compensator 217.

$R_{BMC}(x,y)$ calculator 211 calculates a residual signal $R_{BMC}(x,y)$ in a block motion reconstruction.

$D_N(x,y)$ calculator 213 calculates a differential pixel value $D_N(x,y)$ between a motion compensated block generated by a motion vector of an adjacent block and a currently motion compensated block. Specifically, $D_N(x,y)$ calculator 213 calculates the $D_N(x,y)$ by using a formula of $D_N(x,y)=f_C(x,y)-f_N(x,y)$ wherein $f_C(x,y)$ represents the pixels through a block motion reconstruction with the use of a motion vector of the current block and $f_N(x,y)$ represents the pixels through a block motion reconstruction with the use of a motion vector of the adjacent block N.

Additional information updating/setting unit 215 operates based on the $R_{BMC}(x,y)$ and the $D_N(x,y)$ to update and set additional information for performing an adaptive overlapped block motion compensation. The detailed features of additional information updating/setting unit 215 will be described with reference to FIG. 4.

Adaptive overlapped block motion compensator 217 performs the adaptive overlapped block motion compensation for respective pixels in certain pixel units based on the additional information set by additional information updating/setting unit 215, and it progresses the adaptive overlapped block motion compensation over to subsequent pixels as long as an absolute value of the $R_{BMC}(x,y)$ is smaller than or equal to the additional information, and if the absolute value of the $R_{BMC}(x,y)$ is greater than the additional information, calculates an $R_{OBMC}(x,y)$ with an $H_N(x,y)$ selectively signed so that an absolute value of the $R_{OBMC}(x,y)$ is smaller than the absolute value of the $R_{BMC}(x,y)$. In other words, if the absolute value of the $R_{BMC}(x,y)$ is greater than the additional information, adaptive overlapped block motion compensator 217 determines the sign of the $H_N(x,y)$ so that the $R_{BMC}(x,y)$ and $H_N(x,y) \times D_N(x,y)$ are signed opposite to each other, and then calculates the $R_{OBMC}(x,y)$ based on a formula of $R_{OBMC}(x,y)=R_{BMC}(x,y)+H_N(x,y) \times D_N(x,y)$.

Figure 4:
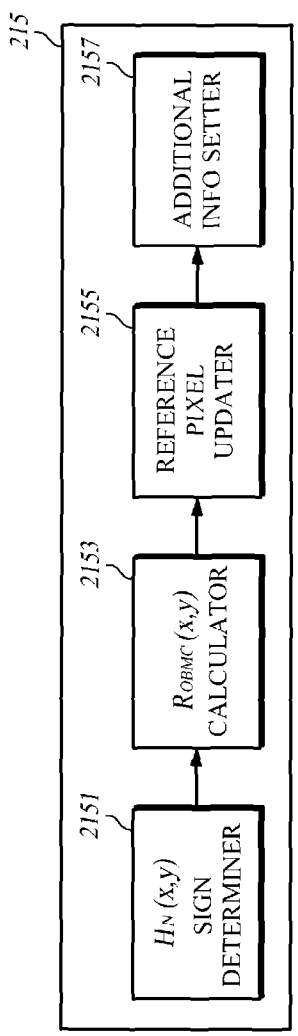
FIG. 4 is a detailed block diagram of an additional information updating/setting unit of FIG. 3.

FIG. 4 is a detailed block diagram of additional information updating/setting unit 215 of FIG. 3 which includes an $H_N(x,y)$ sign determiner 2151, an $R_{OBMC}(x,y)$ calculator 2153, a reference pixel updater 2155, and an additional information setter 2157.

$H_N(x,y)$ sign determiner 2151 makes a determination on the sign of the $H_N(x,y)$ that is a weight based on the signs of the $R_{BMC}(x,y)$ and the $D_N(x,y)$, and it determines the sign of the $H_N(x,y)$ so that the absolute value of the $R_{OBMC}(x,y)$ is always smaller than the absolute of the $R_{BMC}(x,y)$ considering the $R_{OBMC}(x,y)$ is calculated based on the formula of $R_{OBMC}(x,y)=R_{BMC}(x,y)+H_N(x,y) \times D_N(x,y)$ with the $R_{BMC}(x,y)$ and the $D_N(x,y)$ are integer values between $-255$ and $2555$. For example, if the $R_{BMC}(x,y)$ is valued positive, the $H_N(x,y)$ is selectively signed to have $H_N(x,y) \times D_N(x,y)$ signed negative, and if the $R_{BMC}(x,y)$ is valued negative, the $H_N(x,y)$ is selectively signed to have $H_N(x,y) \times D_N(x,y)$ signed positive.

$R_{OBMC}(x,y)$ calculator 2153 operates based on the sign of the $H_N(x,y)$ determined by $H_N(x,y)$ sign determiner 2151 to calculate the $R_{OBMC}(x,y)$ that is a residual signal at the time of the overlapped block motion compensation based on a formula of $R_{OBMC}(x,y)=R_{BMC}(x,y)+H_N(x,y) \times D_N(x,y)$.

Reference pixel updater 2155 updates a first reference pixel $R_{om}$ or a second reference pixel $R_{bm}$ based on the sign of the $R_{BMC}(x,y)$ calculated by $R_{BMC}(x,y)$ calculator 211 and the sign of the $R_{OBMC}(x,y)$ calculated by $R_{OBMC}(x,y)$ calculator 2153 so that the first reference pixel $R_{om}$ is updated to be smaller one of the absolute value of the first reference pixel $R_{om}$ preceding the $R_{OBMC}(x,y)$ and the absolute value of the $R_{OBMC}(x,y)$ if the sign of the $R_{BMC}(x,y)$ and the sign of the $R_{OBMC}(x,y)$ are same, and the second reference pixel $R_{bm}$ is updated to be larger one of the absolute value of the second reference pixel $R_{bm}$ preceding the $R_{BMC}(x,y)$ and the absolute value of the $R_{BMC}(x,y)$ if the sign of the $R_{BMC}(x,y)$ and the sign of the $R_{OBMC}(x,y)$ are not same. This process of updating is performed sequentially on the respective pixels in certain pixel units, which will be described in detail.

Upon completing the process of updating with respect to all pixels in the certain pixel units, additional information setter 2157 for setting larger one of the finally updated first reference pixel $R_{om}$ and the finally updated second reference pixel $R_{bm}$ as the additional information $R_m$ for the certain units.

Figure 5:
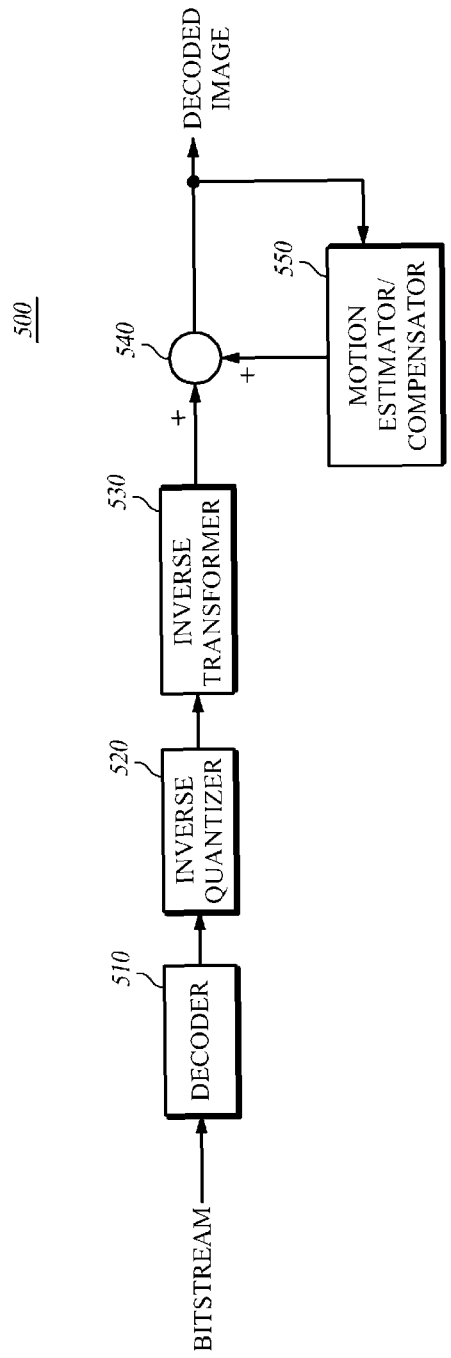
FIG. 5 is a block diagram of a video decoding apparatus according to an aspect.

FIG. 5 is a block diagram of a video decoding apparatus 500 according to an aspect.

As illustrated, video decoding apparatus 500 in this aspect is for decoding the video by predicting the current block of the video using one or more adjacent blocks of the current block, and includes a decoder 510, an inverse quantizer 520, an inverse transformer 530, an adder 540, and a motion estimator/compensator 550.

As with video encoding apparatus 200 described with reference to FIG. 2, video decoding apparatus 500 may be a personal computer or PC, notebook or laptop computer, personal digital assistant or PDA, portable multimedia player or PMP, PlayStation Portable or PSP, or mobile communication terminal, smart phone or such devices, and may represent a variety of apparatuses equipped with, for example, a communication device such as a modem for carrying out communications between various devices or wired/wireless communication networks, a memory for storing various programs for encoding videos and related data, and a microprocessor for executing the programs to effect operations and controls.

Decoder 510 decodes the bitstream to extract the quantized frequency coefficients. Specifically, decoder 510 decodes the bitstream which is the video encoded by video encoding apparatus 200 and extracts the quantized frequency coefficients which contain pixel information of the video current block.

Inverse quantizer 520 performs a de-quantization with respect to the frequency coefficients extracted from the bitstream by decoder 510.

Inverse transformer 530 inversely transforms the de-quantized frequency coefficients from inverse quantizer 520 into time-domain to generate a residual signal.

Adder 530 adds predicted pixel values of the respective pixels of the current block predicted by motion estimator/compensator 550 to the inversely transformed residual signal from inverse transformer 530 to reconstruct the original pixel value of the current block.

Figure 6:
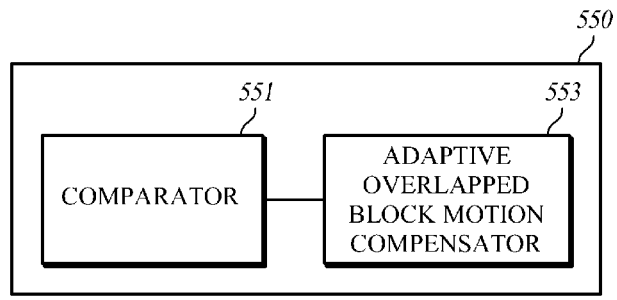
FIG. 6 is a block diagram of an adaptive overlapped block motion compensation apparatus employing adaptive weights according to another aspect.

FIG. 6 is a block diagram of an adaptive overlapped block motion compensation apparatus 550 employing adaptive weights according to an aspect which corresponds to motion estimator/compensator 550 in FIG. 5 and is referenced by the same number 550.

As illustrated, the other aspect of adaptive overlapped block motion compensation apparatus 550 employing the adaptive weights includes a comparator 551 and an adaptive overlapped block motion compensator 553.

Comparator 551 compares the quantities between the absolute value of residual signal $R_{BMCT}(x,y)$ at the time of a block motion compensation and additional information $R_m$ which has been set.

Adaptive overlapped block motion compensator 553 progresses an adaptive overlapped block motion compensation over to subsequent pixels as long as an absolute value of the $R_{BMCT}(x,y)$ is smaller than or equal to additional information $R_m$, and if the absolute value of the $R_{BMCT}(x,y)$ is greater than additional information $R_m$, calculates an $R_{OBMC}(x,y)$ with an $H_N(x,y)$ selectively signed so that the absolute value of the $R_{OBMC}(x,y)$ is greater than the absolute value of the $R_{BMC}(x,y)$. In other words, if the absolute value of the $R_{BMCT}(x,y)$ is greater than additional information $R_m$, adaptive overlapped block motion compensator 553 determines the sign of the $H_N(x,y)$ so that the $R_{BMCT}(x,y)$ and $H_N(x,y) \times D_N(x,y)$ are signed identical to each other, and then calculates the $R_{OBMC}(x,y)$ based on a formula of $R_{OBMC}(x,y) = R_{BMC}(x,y) + H_N(x,y) \times D_N(x,y)$.

Additional information $R_m$ is generated and provided by encoding apparatus 200 and is set as described above.

Figure 7:
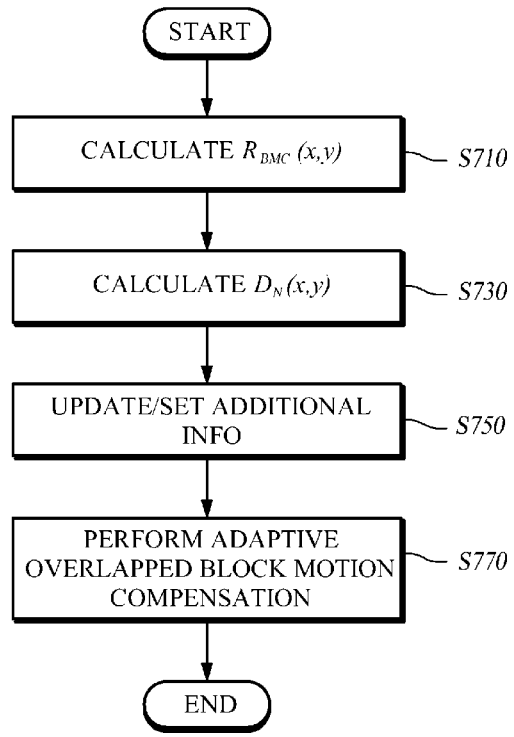
FIG. 7 is a flow diagram for illustrating an adaptive overlapped block motion compensation method employing adaptive weights according to an aspect.

FIG. 7 is a flow diagram for illustrating an adaptive overlapped block motion compensation method employing the adaptive weights according to an aspect, and will be described as operatively applied to motion estimator/compensator 210 of encoder 200 in FIG. 2 corresponding to adaptive overlapped block motion compensation apparatus 210 in FIG. 3.

First, residual signal $R_{BMC}(x,y)$ in a block motion reconstruction is generated by $R_{BMC}(x,y)$ calculator 211 in step S710, and pixel value difference $D_N(x,y)$ between a motion compensated block generated by a motion vector of an adjacent block and a currently motion compensated block is generated by $D_N(x,y)$ calculator 213 in step S730.

Next, in additional information updating/setting unit 215, the additional information for performing the adaptive overlapped block motion compensation is updated and set based on the $R_{BMC}(x,y)$ and the $D_N(x,y)$ in step S750. Step S750 will be described in detail with reference to FIG. 8.

Additionally, in adaptive overlapped block motion compensator 213 carries out the adaptive overlapped block motion compensation for respective pixels in certain pixel units, based on the additional information set by additional information updating/setting unit 215, proceeds the adaptive overlapped block motion compensation over to subsequent pixels as long as an absolute value of the $R_{BMC}(x,y)$ is smaller than or equal to the additional information, and if the absolute value of the $R_{BMC}(x,y)$ is greater than the additional information, calculating an $R_{OBMC}(x,y)$ with an $H_N(x,y)$ selectively signed so that the absolute value of the $R_{OBMC}(x,y)$ is smaller than the absolute value of the $R_{BMC}(x,y)$. $R_{OBMC}(x,y)$ is calculated based on a formula of $R_{OBMC}(x,y) = R_{BMC}(x,y) + H_N(x,y) \times D_N(x,y)$ (S770).

Figure 8:
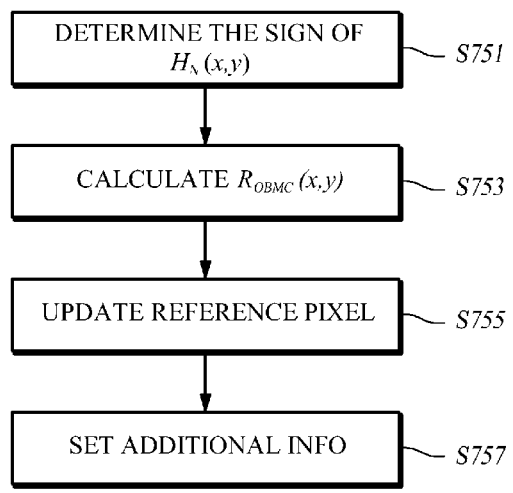
FIG. 8 is a detailed flow diagram for showing a step of updating/setting additional information of FIG. 7.

FIG. 8 is a detailed flow diagram for showing step S750 of updating/setting additional information of FIG. 7

First, $H_N(x,y)$ sign determiner 2151 determines the sign of $H_N(x,y)$ based on the signs of the $R_{BMC}(x,y)$ from $R_{BMC}(x,y)$ calculator 211 and the $D_N(x,y)$ from $D_N(x,y)$ calculator 213 in step S751.

Next, based on the sign of the $H_N(x,y)$ determined by $H_N(x,y)$ sign determiner 2151, $R_{OBMC}(x,y)$ calculator 2153 calculates residual signal $R_{OBMC}(x,y)$ at an overlapped block motion reconstruction in step S753.

Then in step S755, reference pixel updater 2155 updates a first reference pixel $R_{om}$ or a second reference pixel $R_{bm}$ based on the sign of the $R_{BMC}(x,y)$ calculated by $R_{BMC}(x,y)$ calculator 211 and the sign of the $R_{OBMC}(x,y)$ calculated by $R_{OBMC}(x,y)$ calculator 2153 so that the first reference pixel $R_{om}$ is updated to be smaller one of the absolute value of the first reference pixel $R_{om}$ preceding the $R_{OBMC}(x,y)$ and the absolute value of the $R_{OBMC}(x,y)$ if the sign of the $R_{BMC}(x,y)$ and the sign of the $R_{OBMC}(x,y)$ are same, and the second reference pixel $R_{bm}$ is updated to be larger one of the absolute value of the second reference pixel $R_{bm}$ preceding the $R_{BMC}(x,y)$ and the absolute value of the $R_{BMC}(x,y)$ if the sign of the $R_{BMC}(x,y)$ and the sign of the $R_{OBMC}(x,y)$ are not same. This process of updating the reference pixels will be described in detail through specific examples to follow.

Finally, additional information setter 2157 completes the process of updating with respect to all the pixels in the certain pixel units, and then sets larger one of the finally updated first reference pixel $R_{om}$ and the finally updated second reference pixel $R_{bm}$ as the additional information $R_m$ for the certain units in step S757.

Now, a particular example of the present disclosure will be presented to facilitate a more specific understanding of the above description.

For the purpose of the specific description, the overlapped block motion compensation technique of H.263 ("Video coding for low bit rate communication", Draft, ITU-T Recommendation H.263, September 1997) will be first discussed.

The overlapped block motion compensation by H.263 is accomplished in units of 8 8 block through a calculation of Equation 1:

$$p(x, y) = \left[ q(x, y) \cdot H_c(x, y) + \sum_N r_N(x, y) \cdot H_N(x, y) + 4 \right] / 8 \quad \text{[Equation 1]}$$

Here, p(x,y) means a motion compensated pixel value to be generated by the overlapped block motion compensation, and coordinates (x,y) indicate the locations of pixels in the 8 8 block and have values 0 to 7 with the top left location of the block being (0,0). In addition, q(x,y) means a motion compensated pixel value of the 8 8 block subject to the current reconstruction and it is obtained through Equation 2 if the motion vector received via transmission for the current block $$(MV^x{}_C, MV^y{}_C): q(x,y) = f_{t-1}(x + MV^x{}_C, y + MV^y{}_C) \quad \text{Equation 2}$$

Here, $f_{t-1}(x,y)$ means the pixel values of the previously reconstructed image at locations (x,y). In Equation 1, N indicates neighboring blocks of the block subject to a current reconstruction and is valued T, B, L, or R representing indices of blocks neighboring the current block at its top, bottom, left, and right boundaries, respectively. Therefore, when N=T is given, $r_N(x,y)$ is obtained as with $r_T(x,y) = f_{t-1}(x + MV^x{}_T, y + MV^y{}_T)$, where $(MV^x{}_T, MV^y{}_T)$ means a motion vector received via transmission for the top adjacent block to the current block. Similarly, for other values of N, it is also possible to obtain $r_N(x,y)$ by using motion vectors of the neighboring blocks and the previously reconstructed image. Finally, in Equation 1, $H_C(x,y)$ and $H_N(x,y)$ represent weights located at (x,y) and multiplied by q(x,y) that is a block of pixels reconstructed with the motion vector of the current block and by $r_N(x,y)$ that is a block of pixels reconstructed with the motion vector of the neighboring block, and the weight matrix at each location is as shown in FIG. 9.

As described above, the overlapped block motion compensation method by H.263 uses the statistically optimized fixed weight matrix to perform motion compensation for every 8 8 block via Equation 1 and thereby noticeably reduces the blocking artifacts relatively to its prior art block motion compensations. However, the reconstructed image will have partial blocks that generate significantly degraded residual signals compared to the prior art block motion compensations, which may be quantitatively interpreted as in the following review of the residual signal changes in the overlapped block motion compensation method for each of the boundaries of the neighboring blocks:

Initially, to observe the changes in the residual signal for each of the boundaries by different overlapped block motion compensation methods, weights for each boundary $H_{CN}(x,y)$ for application to the blocks subject to the current reconstruction is redefined as Equation 3:

$$H_{CN}(x,y)+H_N(x,y)=1 \quad \text{Equation 3}$$

Here, N is similarly valued T, B, L, or R as above. If $f_t(x,y)$ defines the pixel value of the current image to be encoded, $f_C(x,y)$ is a pixel through a block motion reconstruction with a motion vector of the current block, and $f_N(x,y)$ is a pixel through a block motion reconstruction with a motion vector of adjacent block N, then a residual signal $R_{BMC}(x,y)$ with the block motion reconstruction applied and a residual signal $R_{OBMC}(x,y)$ with the overlapped block motion reconstruction applied may be expressed as Equation 4 and Equation 5, respectively.

$$R_{BMC}(x, y) = f_t(x, y) - f_C(x, y) \quad \text{[Equation 4]}$$

$$\begin{aligned}R_{OBMC}(x, y) &= f_t(x, y) - H_{CN}(x, y) \cdot f_C(x, y) - \\ & \quad H_N(x, y) \cdot f_N(x, y) \\ &= f_t(x, y) - f_C(x, y) + H_N(x, y) \cdot \\ & \quad (f_C(x, y) - f_N(x, y)) \\ &= R_{BMC}(x, y) + H_N(x, y) \cdot D_N(x, y)\end{aligned} \quad \text{[Equation 5]}$$

Here, $D_N(x,y)$ as defined by the following Equation 6 corresponds to a measurement of difference for representing how different the motion reconstruction at the current block location with the motion vector of adjacent block N is from motion compensation with the motion vector of the current block.

$$D_n(x,y)=f_C(x,y)-f_N(x,y) \quad \text{Equation 6}$$

In Equation 5, when considering $R_{BMC}(x,y)$ and $D_N(x,y)$ are integer values in the range of [−255 to 255], in order to have the power of $R_{OBMC}(x,y)$ stay below that of $R_{BMC}(x,y)$, is preferable that $H_N(x,y)$ is valued negative occasionally. Therefore, according to the present disclosure as in a particular example to follow, it is arranged to use a negative value besides 0 or a positive value for $H_N(x,y)$ that is the weight in the overlapped block motion compensation method and hold a transmission of additional information in units of a pixel, thereby resolving the described technical problem. In the following description of aspects, the originality of the disclosure is not meant to be limiting but to give concrete illustrations to help one to understand the idea of the disclosure.

Particular Aspect 1 (Encoder Stage)

For example, as the overlapped block motion compensation weight of H.263, if $H_N(x,y)$ defines a positive weight matrix that can minimize the energy of error signals, each of the following steps are performed with N=T,B and their results are put into the same steps with N=L,R. The following steps are performed with respect to each pixel in certain units for the image encoding:

[Step 1 (Initializing Step)]

In reference pixel updater 2155 of additional information updating/setting unit 215, first reference pixel $R_{om}$ and second reference pixel $R_{bm}$ are initialized to put $R_{om}=\infty, R_{bm}=\infty$.

[Step 2]

If value $R_{BMC}(x,y)$ generated by $R_{BMC}(x,y)$ calculator 211 is 0 considering a quantization step, the process goes to a next pixel.

[Step 3]

If value $R_{BMC}(x,y)$ generated by $R_{BMC}(x,y)$ calculator 211 is positive considering the quantization step, $H_N(x,y)$ sign determiner 2151 of additional information updating/setting unit 215 determines the sign of $H_N(x,y)$ so that $H_N(x,y) \cdot D_N(x,y)$ in Equation 5 becomes negative, and $R_{OBMC}(x,y)$ calculator 2153 calculates $R_{OBMC}(x,y)$ based on the determined sign of the $H_N(x,y)$. If calculated $R_{OBMC}(x,y)$ is valued positive considering the quantization, reference pixel updater 2155 updates first reference information $R_{om}$. This update means replacing first reference information $R_{om}$ with smaller one of the first reference information $R_{om}$ that is preceding and the calculated $R_{OBMC}(x,y)$. If the calculated $R_{OBMC}(x,y)$ is negative or 0 considering the quantization, reference pixel updater 2155 updates second reference information $R_{bm}$. This update means replacing second reference information $R_{bm}$ with smaller one of the second reference information $R_{bm}$ and $R_{BMC}(x,y)$.

[Step 4]

If value $R_{BMC}(x,y)$ generated by $R_{BMC}(x,y)$ calculator 211 is negative considering the quantization step, $H_N(x,y)$ sign determiner 2151 of additional information updating/setting unit 215 determines the sign of $H_N(x,y)$ so that $H_N(x,y) \cdot D_N(x,y)$ in Equation 5 becomes positive, and $R_{OBMC}(x,y)$ calculator 2153 calculates $R_{OBMC}(x,y)$ based on the determined sign of the $H_N(x,y)$. If calculated $R_{OBMC}(x,y)$ is valued negative considering the quantization, reference pixel updater 2155 updates first reference pixel $R_{om}$. This update means replacing first reference pixel $R_{om}$ with smaller one of the first reference pixel $R_{om}$ that is preceding and the calculated $-R_{OBMC}(x,y)$. If the calculated $R_{OBMC}(x,y)$ is positive or 0 considering the quantization, reference pixel updater 2155 updates second reference pixel $R_{bm}$. This update means replacing second reference pixel $R_{bm}$ with smaller one of the second reference pixel $R_{bm}$ and $-R_{BMC}(x,y)$.

[Step 5]

Upon completing the steps 2 through 4 on all the pixels in certain pixel units, additional information setter 2157 of additional information updating/setting unit 215 sets larger one of the final first reference pixel $R_{om}$ and the final second reference pixel $R_{bm}$ as additional information $R_m$ and transmit the latter to decoder 500, and adaptive overlapped block motion compensator 217 performs the following steps 6 and 7 for respective pixels in certain pixel units.

[Step 6]

If the absolute value of $R_{BMC}(x,y)$ is smaller than or equal to the additional information $R_m$, the process goes to a next pixel.

[Step 7]

If the absolute value of $R_{BMC}(x,y)$ is greater than the additional information $R_m$, the sign of $H_N(x,y)$ is determined so that $H_N(x,y) \cdot D_N(x,y)$ in Equation 5 is signed opposite to $R_{BMC}(x,y)$, and $R_{OBMC}(x,y)$ in Equation 5 is calculated based on the determined sign of the $H_N(x,y)$.

Particular Aspect 2 (Decoder Stage)

For example, as the overlapped block motion compensation) weight of H.263, if $H_N(x,y)$ defines a positive weight matrix that can minimize the energy of error signals, each of the following steps are performed with N=T,B and their results are subject to the same steps with N=R,L. The following steps are performed with respect to each pixel in certain units for the image decoding:

Using the additional information $R_m$ transmitted from encoder 200, the following steps are performed on each pixel.

[Step 1]

Comparator 551 of motion estimator/compensator 550 compares between the absolute value $R_{BMCT}(x,y)$ and the additional information $R_m$ and progresses to the next pixel if the absolute value of $R_{BMCT}(x,y)$ is smaller than or equal to the additional information $R_m$.

[Step 2]

If comparator 551 finds that the absolute value of $R_{BMCT}(x,y)$ is greater than the additional information $R_m$, adaptive overlapped block motion compensator 553 of motion estimator/compensator 550 determines the sign of $H_N(x,y)$ so that $H_N(x,y) \cdot D_N(x,y)$ in Equation 5 is signed equal to $R_{BMC}(x,y)$, and calculates $R_{OBMC}(x,y)$ in Equation 5 based on the determined sign of $H_N(x,y)$. In other words, $R_{OBMC}(x,y)$ is calculated based on a formula of $R_{OBMC}(x,y) = R_{BMCT}(x,y) + H_N(x,y) \times D_N(x,y)$.

In the description above, although the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the embodiments of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those skilled in the art will appreciate that various modifications, additions and substitutions are possible, without departing from essential characteristics of the disclosure. Therefore, exemplary embodiments of the present disclosure have not been described for limiting purposes. Accordingly, the scope of the disclosure is not to be limited by the above embodiments but by the claims and the equivalents thereof.

[Industrial Applicability]

As described above, the present disclosure is highly useful for application to video encoding/decoding techniques to use negative, 0 and positive weights adaptively for an overlapped block motion estimation/compensation by pixel unit, whereby significantly reducing the calculation volume and the residual signal energy at block boundaries to be encoded by using just insignificant additional information to greatly improve the performance of a video compression apparatus and eventually obtain an enhanced video quality for the same bits or amount of information.

The invention claimed is:

1. An adaptive overlapped block motion compensation apparatus employing adaptive weights comprising:
   an $R_{BMC}(x,y)$ calculator for performing a calculation of a residual signal $R_{BMC}(x,y)$ in a block motion estimation;
   a $D_N(x,y)$ calculator for performing a calculation of a differential pixel value $D_N(x,y)$ between a motion compensated block generated by a motion vector of an adjacent block and a currently motion compensated block through a currently estimated motion vector;
   an additional information updating/setting unit for updating and setting additional information for performing an adaptive overlapped block motion compensation based on the $R_{BMC}(x,y)$ and the $D_N(x,y)$; and
   an adaptive overlapped block motion compensator for performing the adaptive overlapped block motion compensation for respective pixels in certain pixel units based on the additional information, progressing the adaptive overlapped block motion compensation over to subsequent pixels as long as an absolute value of the $R_{BMC}(x,y)$ is smaller than or equal to the additional information, and if the absolute value of the $R_{BMC}(x,y)$ is greater than the additional information, calculating a residual signal $R_{OBMC}(x,y)$ with an $H_N(x,y)$ selectively signed so that an absolute value of the $R_{OBMC}(x,y)$ in an overlapped block motion reconstruction is smaller than the absolute value of the $R_{BMC}(x,y)$, wherein HN(x,y) represents a weight located at (x,y).

2. The adaptive overlapped block motion compensation apparatus employing adaptive weights of claim 1, wherein the additional information updating/setting unit comprising:
   an $H_N(x,y)$ sign determiner for making a determination on a sign of the $H_N(x,y)$ that is a weight based on a sign of the $R_{BMC}(x,y)$ after the calculation and a sign of the $D_N(x,y)$ after the calculation;
   an $R_{OBMC}(x,y)$ calculator for performing a calculation of the residual signal $R_{OBMC}(x,y)$ in an overlapped block motion reconstruction based on the sign of the $H_N(x,y)$ upon the determination;
   a reference pixel updater for updating a first reference pixel or a second reference pixel on the basis of the sign of the $R_{BMC}(x,y)$ after the calculation and a sign of the $R_{OBMC}(x,y)$ after the calculation so that the first reference pixel is updated to be smaller one of an absolute value of the first reference pixel preceding the $R_{OBMC}(x,y)$ and an absolute value of the $R_{OBMC}(x,y)$ if the sign of the $R_{BMC}(x,y)$ and the sign of the $R_{OBMC}(x,y)$ are same, and the second reference pixel is updated to be larger one of an absolute value of the second reference pixel preceding the $R_{BMC}(x,y)$ and the absolute value of the $R_{BMC}(x,y)$ if the sign of the $R_{BMC}(x,y)$ and the sign of the $R_{OBMC}(x,y)$ are not same; and
   an additional information setter for setting larger one of the first reference pixel and the second reference pixel as the additional information.

3. The adaptive overlapped block motion compensation apparatus employing adaptive weights of claim 2, wherein the $H_N(x,y)$ sign determiner in a motion estimation determines the sign of the $H_N(x,y)$ so that the $R_{BMC}(x,y)$ valued positive causes $H_N(x,y) \times D_N(x,y)$ to be signed negative and determines the sign of the $H_N(x,y)$ so that the $R_{BMC}(x,y)$ valued negative causes $H_N(x,y) \times D_N(x,y)$ to be signed positive.

4. The adaptive overlapped block motion compensation apparatus employing adaptive weights of claim 2, wherein the $R_{OBMC}(x,y)$ calculator and the adaptive overlapped block motion compensator calculate the $R_{OBMC}(x,y)$ based on a formula of $R_{OBMC}(x,y) = R_{BMC}(x,y) + H_N(x,y) \times D_N(x,y)$.

5. The adaptive overlapped block motion compensation apparatus employing adaptive weights of claim 2, wherein the reference pixel updater performs the updating of the first reference pixel and the second reference pixel sequentially with respect to all pixels in the certain pixel units.

6. The adaptive overlapped block motion compensation apparatus employing adaptive weights of claim 1, wherein the adaptive overlapped block motion compensator determines a sign of the $H_N(x,y)$ so that the $R_{BMC}(x,y)$ and $H_N(x,y) \times D_N(x,y)$ are signed opposite to each other.

7. An adaptive overlapped block motion compensation method employing adaptive weights comprising:

performing a calculation of a residual signal $R_{BMC}(x,y)$ in a block motion estimation using an RBMC(x,y) calculator;

performing a calculation of a differential pixel value $D_N(x,y)$ between a motion compensated block generated by a motion vector of an adjacent block and a currently motion compensated block through a currently estimated motion vector using a DN(x,y) calculator;

updating/setting additional information for performing an adaptive overlapped block motion compensation based on the $R_{BMC}(x,y)$ and the $D_N(x,y)$ using an additional information updating/setting unit; and performing the adaptive overlapped block motion compensation for respective pixels in certain pixel units based on the additional information, progressing the adaptive overlapped block motion compensation over to subsequent pixels as long as an absolute value of the $R_{BMC}(x,y)$ is smaller than or equal to the additional information, and if the absolute value of the $R_{BMC}(x,y)$ is greater than the additional information, calculating a residual signal $R_{OBMC}(x,y)$ with an $H_N(x,y)$ selectively signed so that an absolute value of the $R_{OBMC}(x,y)$ in an overlapped block motion reconstruction is smaller than the absolute value of the $R_{BMC}(x,y)$, using an adaptive overlapped block motion compensator, wherein HN(x,y) represents a weight located at (x,y).

8. The adaptive overlapped block motion compensation method employing adaptive weights of claim 7, wherein the step of updating/setting additional information comprising:

performing a determination on a sign of the $H_N(x,y)$ that is a weight based on a sign of the $R_{BMC}(x,y)$ after the calculation and a sign of the $D_N(x,y)$ after the calculation;

performing a calculation of the residual signal $R_{OBMC}(x,y)$ in an overlapped block motion reconstruction based on the sign of the $H_N(x,y)$ upon the determination;

updating a reference pixel of a first reference pixel or a second reference pixel based on the sign of the $R_{BMC}(x,y)$ after the calculation and a sign of the $R_{OBMC}(x,y)$ after the calculation so that the first reference pixel is updated to be smaller one of an absolute value of the first reference pixel preceding the $R_{OBMC}(x,y)$ and an absolute value of the $R_{OBMC}(x,y)$ if the sign of the $R_{BMC}(x,y)$ and the sign of the $R_{OBMC}(x,y)$ are same, and the second reference pixel is updated to be larger one of an absolute value of the second reference pixel preceding the $R_{BMC}(x,y)$ and an absolute value of the $R_{BMC}(x,y)$ if the sign of the $R_{BMC}(x,y)$ and the sign of the $R_{OBMC}(x,y)$ are not same; and setting larger one of the first reference pixel and the second reference pixel as the additional information.

9. The adaptive overlapped block motion compensation method employing adaptive weights of claim 8, wherein the step of performing the determination of the sign of the $H_N(x,y)$ determines the sign of the $H_N(x,y)$ so that the $R_{BMC}(x,y)$ valued positive causes $H_N(x,y) \times D_N(x,y)$ to be signed negative and determines the sign of the $H_N(x,y)$ so that the $R_{BMC}(x,y)$ valued negative causes $H_N(x,y) \times D_N(x,y)$ to be signed positive.

10. The adaptive overlapped block motion compensation method by variable units of claim 9, wherein the constant k is determined in consideration of a ratio of compression efficiency to a computation cost.

11. The adaptive overlapped block motion compensation method by variable units of claim 8, wherein the step of updating the reference pixel performs the updating of the first reference pixel and the second reference pixel sequentially with respect to all pixels in the certain pixel units.

12. The adaptive overlapped block motion compensation method by variable units of claim 7, wherein the step of performing the adaptive overlapped block motion compensation determines a sign of the $H_N(x,y)$ so that the $R_{BMC}(x,y)$ and $H_N(x,y) \times D_N(x,y)$ are signed opposite to each other.

13. A video encoding apparatus comprising:

a motion estimator/compensator for performing an adaptive overlapped block motion compensation for respective pixels in certain pixel units based on additional information having been set, progressing the adaptive overlapped block motion compensation over to subsequent pixels as long as an absolute value of a residual signal $R_{BMC}(x,y)$ in a block motion reconstruction is smaller than or equal to the set additional information, and if the absolute value of the $R_{BMC}(x,y)$ is greater than the additional information, calculating a residual signal $R_{OBMC}(x,y)$ with an $H_N(x,y)$ selectively signed so that an absolute value of the $R_{OBMC}(x,y)$ in an overlapped block motion reconstruction is smaller than the absolute value of the $R_{BMC}(x,y)$ to predict predicted pixel values of respective pixels in an image, wherein HN(x,y) represents a weight located at (x,y);

a subtractor for calculating a difference between an original pixel value of each pixel of a current block and a predicted pixel value of each pixel of the current block to generate a residual signal;

a transformer for performing a transform of the residual signal into frequency coefficients;

a quantizer for performing a quantization of the frequency coefficients after the transform; and an encoder for encoding the frequency coefficients after the quantization into a bitstream.

14. The video encoding apparatus of claim 13, wherein the motion estimator/compensator calculates the $R_{OBMC}(x,y)$ based on a formula of $R_{OBMC}(x,y) = R_{BMC}(x,y) + H_N(x,y) \times D_N(x,y)$.

15. The video encoding apparatus of claim 14, wherein the motion estimator/compensator determines a sign of the $H_N(x,y)$ so that the $R_{BMC}(x,y)$ and $H_N(x,y) \times D_N(x,y)$ are signed opposite to each other.

16. The video encoding apparatus of claim 13, wherein the motion estimator/compensator makes a determination on a sign of the $H_N(x,y)$ based on a sign of the $R_{BMC}(x,y)$ and a differential pixel value $D_N(x,y)$ between a motion compensated block generated by a motion vector of an adjacent block and a currently motion compensated block; performs a calculation of a residual signal $R_{OBMC}(x,y)$ in an overlapped block motion reconstruction based on the sign of the $H_N(x,y)$ upon the determination; updates a first reference pixel or a second reference pixel based on a sign of the $R_{OBMC}(x,y)$ after the calculation and the sign of the $R_{BMC}(x,y)$ so that the first reference pixel is updated to be smaller one of an absolute value of the first reference pixel preceding the $R_{OBMC}(x,y)$ and an absolute value of the $R_{OBMC}(x,y)$ if the sign of the $R_{BMC}(x,y)$ and the sign of the $R_{OBMC}(x,y)$ are same, and the second reference pixel is updated to be larger one of an absolute value of the second reference pixel preceding the $R_{BMC}(x,y)$ and the absolute value of the $R_{BMC}(x,y)$ if the sign of the $R_{BMC}(x,y)$ and the sign of the $R_{OBMC}(x,y)$ are not same; and sets larger one of the first reference pixel and the second reference pixel as the additional information.

17. A video decoding apparatus comprising:
- a comparator for comparing an absolute value of a residual signal $R_{BMCT}(x,y)$ in a block motion reconstruction to additional information, the $R_{BMCT}(x,y)$ having been encoded and transmitted and the additional information having been set; and
- an adaptive overlapped block motion compensator for performing an adaptive overlapped block motion compensation on each of successive pixels as long as the absolute value of the $R_{BMCT}(x,y)$ is smaller than or equal to the additional information, and if the absolute value of the $R_{BMCT}(x,y)$ is greater than the additional information, calculating an $R_{OBMC}(x,y)$ with an $H_N(x,y)$ selectively signed so that an absolute value of the $R_{OBMC}(x,y)$ is greater than the absolute value of the $R_{BMCT}(x,y)$, wherein HN(x,y) represents a weight located at (x,y).

18. The video decoding apparatus of claim 17, wherein the adaptive overlapped block motion compensator calculates the $R_{OBMC}(x,y)$ based on a formula of $R_{OBMC}(x,y)=R_{BMCT}(x,y)-H_N(x,y) \times D_N(x,y)$.

19. The video decoding apparatus of claim 18, wherein the adaptive overlapped block motion compensator determines a sign of the $H_N(x,y)$ so that the $R_{BMCT}(x,y)$ and $H_N(x,y) \times D_N(x,y)$ are signed identical to each other.

20. The video decoding apparatus of claim 17, wherein the additional information is generated and provided by an encoding apparatus and the encoding apparatus makes a determination on a sign of the $H_N(x,y)$ that is a weight based on a sign of an $R_{BMC}(x,y)$ and a differential pixel value $D_N(x,y)$ between a motion compensated block generated by a motion vector of an adjacent block and a currently motion compensated block; performs a calculation of a residual signal $R_{OBMC}(x,y)$ in an overlapped block motion reconstruction based on the sign of the $H_N(x,y)$ upon the determination; performs an update of a first reference pixel or a second reference pixel based on a sign of the $R_{OBMC}(x,y)$ after the calculation and the sign of the $R_{BMC}(x,y)$ so that the first reference pixel is updated to be smaller one of an absolute value of the first reference pixel preceding the $R_{OBMC}(x,y)$ and an absolute value of the $R_{OBMC}(x,y)$ if the sign of the $R_{BMC}(x,y)$ and the sign of the $R_{OBMC}(x,y)$ are same, and the second reference pixel is updated to be larger one of an absolute value of the second reference pixel preceding the $R_{BMC}(x,y)$ and the absolute value of the $R_{BMC}(x,y)$ if the sign of the $R_{BMC}(x,y)$ and the sign of the $R_{OBMC}(x,y)$ are not same; and upon completing the update of every pixel in certain pixel units, sets larger one of the first reference pixel and the second reference pixel as the additional information.

* * * * *